United States Patent
He

(10) Patent No.: US 10,595,278 B2
(45) Date of Patent: Mar. 17, 2020

(54) POWER INFORMATION SENDING METHOD, TERMINAL DEVICE, AND NETWORK DEVICE

(71) Applicant: Huawei Technologies Co., Ltd., Shenzhen (CN)

(72) Inventor: Chuanfeng He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/024,384

(22) Filed: Jun. 29, 2018

(65) Prior Publication Data

US 2018/0310253 A1     Oct. 25, 2018

Related U.S. Application Data

(63) Continuation of application No. PCT/CN2015/100327, filed on Dec. 31, 2015.

(51) Int. Cl.
| | |
|---|---|
| *H04W 52/14* | (2009.01) |
| *H04W 52/34* | (2009.01) |
| *H04W 52/36* | (2009.01) |
| *H04W 72/04* | (2009.01) |
| *H04W 72/14* | (2009.01) |

(52) U.S. Cl.
CPC ......... *H04W 52/146* (2013.01); *H04W 52/34* (2013.01); *H04W 52/365* (2013.01); *H04W 72/044* (2013.01); *H04W 72/14* (2013.01)

(58) Field of Classification Search
CPC . H04W 52/14; H04W 52/365; H04W 52/146; H04W 52/34

USPC ................ 455/522, 69, 452.1, 509, 67.11
See application file for complete search history.

(56) References Cited

U.S. PATENT DOCUMENTS

| | | | | |
|---|---|---|---|---|
| 2013/0044831 | A1* | 2/2013 | Narasimha | H04W 52/365 375/260 |
| 2013/0322378 | A1* | 12/2013 | Guan | H04W 72/1289 370/329 |
| 2014/0219126 | A1 | 8/2014 | Li | |
| 2014/0314014 | A1 | 10/2014 | Zhang et al. | |
| 2014/0321392 | A1 | 10/2014 | Li | |
| 2014/0376471 | A1 | 12/2014 | Nishio et al. | |

(Continued)

FOREIGN PATENT DOCUMENTS

| | | |
|---|---|---|
| CN | 103037492 A | 4/2013 |
| CN | 103200662 A | 7/2013 |

(Continued)

OTHER PUBLICATIONS

"Physical layers aspects of dual connectivity," ETRI, 3GPP TSG RAN WG1 Meeting #74, R1-133182, 7.2.6.3 L1 impacts of higher-layer aspects of small cell enhancement, Barcelona, Spain, Aug. 19-23, 2013, 4 pages.

(Continued)

*Primary Examiner* — John J Lee
(74) *Attorney, Agent, or Firm* — Slater Matsil, LLP

(57) ABSTRACT

In a power information sending method, a terminal device receives in a first downlink subframe of a first carrier, first scheduling grant information sent by a first network device, sends channel power information to a second network device in a second uplink subframe of a second carrier, and receives second scheduling grant information in a second downlink subframe.

20 Claims, 6 Drawing Sheets

(56) References Cited

U.S. PATENT DOCUMENTS

2016/0286504 A1 9/2016 He et al.
2018/0167960 A1* 6/2018 Zhang .................. H04W 28/04

FOREIGN PATENT DOCUMENTS

| CN | 104025675 A | 9/2014 |
| CN | 104902554 A | 9/2015 |
| CN | 105050189 A | 11/2015 |
| CN | 105101374 A | 11/2015 |
| WO | 2015085517 A1 | 6/2015 |
| WO | 2015113651 A1 | 8/2015 |

OTHER PUBLICATIONS

"Power headroom reporting for dual connectivity," Ericsson, 3GPP TSG RAN WG1 Meeting #76bis, R1-142577, 6.2.4, Seoul, Korea, May 19-23, 2014, 3 pages.

* cited by examiner

POWER INFORMATION SENDING METHOD, TERMINAL DEVICE, AND NETWORK DEVICE

CROSS-REFERENCE TO RELATED APPLICATIONS

This application is a continuation of International Application No. PCT/CN2015/100327, filed on Dec. 31, 2015, the disclosure of which is hereby incorporated by reference in its entirety.

TECHNICAL FIELD

The present invention relates to communications technologies, and in particular, to a power information sending method, a terminal device, and a network device.

BACKGROUND

Inter-base station carrier aggregation (CA) is introduced in the Long Term Evolution (LTE) release (Rel)-12. In a dual connectivity (DC) communication scenario related to the inter-base station carrier aggregation, UE is connected to two base stations to transmit and receive data. Because there is non-ideal backhaul (Backhaul) and a specific scheduling delay between the base stations, the base stations cannot exchange scheduling information of the UE in real time. The two base stations may be a master base station and a secondary base station, and may separately include one or more cells. A carrier group or a cell group of the master base station is referred to as a master carrier group or a master cell group (MCG), and a carrier group or a cell group of the secondary base station is referred to as a secondary carrier group or a secondary cell group (SCG). In a DC system, two base stations are not required to be synchronous. That is, any time difference exists at start moments of downlink transmit subframes of the two base stations, and the downlink transmit subframe plus a timing advance (TA) is an uplink subframe for sending data by corresponding user equipment (UE). Therefore, in a non-synchronous DC scenario, time may mutually overlap in uplink subframes sent by the UE to the two base stations. For example, referring to FIG. 1, a cell 1 and a cell 2 separately pertain to cell groups (or carrier groups) of different base stations. A subframe i is an uplink subframe in the cell 1, a subframe j is an uplink subframe in the cell 2, and the subframe i overlaps with both the subframe j and a subframe j+1 (the subframe j+1 is a next subframe of the subframe j).

When an uplink subframe of the UE in the cell 1 overlaps with an uplink subframe in another different cell, a sum of channel power of the UE in all subframes (the subframe i, the subframe j, and the subframe j+1) in an overlapping part cannot exceed maximum transmit power allowed by the UE. Therefore, when channel power for sending information in the subframe i is being determined, a channel power status of two subframes (the subframe j and the subframe j+1) in a cell in another cell group that overlap with the subframe i needs to be considered.

When the UE does not support "look ahead", that is, when a processing capability of the UE does not support calculating a channel power status of the future subframe j+1 when the channel power of the subframe i is being determined, because a downlink subframe corresponding to the subframe j arrives at the UE earlier than a downlink subframe corresponding to the subframe i, channel power of the subframe j is known to the UE. A practice in the prior art is as follows.

If the UE may perform uplink channel transmission in a subframe j+1 in a cell group 1 of a base station 1, the UE reserves specific guaranteed power for uplink transmission between the UE and the base station 1. If the UE determines that the UE does not perform uplink channel transmission in the subframe j+1 in a cell group 1, for example, it may be determined, according to semi-static configuration information, that uplink transmission is not performed in the subframe j+1, the UE does not reserve power for uplink transmission of the cell group 1. After the UE reserves the specific guaranteed power for uplink transmission between the UE and the base station 1, the UE may send information in the subframe i by using all remaining power (the remaining power is a difference obtained by subtracting the channel power of the subframe j and the guaranteed power of the subframe j+1 from the maximum transmit power allowed by the UE). That is, in the prior art, an uplink subframe sent first preferably occupies power, and an uplink subframe sent later may use at least guaranteed power of a base station in the uplink subframe.

However, in the prior art, because the two base stations cannot coordinate scheduling of the UE in a timely manner, transmit power of the UE cannot be properly used, for example, a base station that schedules the uplink subframe sent later does not know a scheduling status of the uplink subframe sent first. To ensure that total transmit power of the UE does not exceed the maximum transmit power allowed by the UE, the base station that schedules the uplink subframe sent later schedules the UE according to guaranteed power of the base station in the foregoing scheduling policy. However, if the UE is not scheduled in the uplink subframe sent first or is scheduled to use less channel power, the power of the UE is wasted and cannot be used for uplink transmission in the uplink subframe sent later. In another case, a scheduling policy of the base station that schedules the uplink subframe sent later is relatively radical, and the UE is scheduled by using power exceeding the guaranteed power of the base station. However, channel power used for scheduling the UE in the uplink subframe sent first is also quite high. Consequently, the total transmit power of the UE may exceed the maximum transmit power allowed by the UE, power in the uplink subframe sent later is compressed, and a bit error rate increases.

SUMMARY

A power information sending method, a terminal device, and a network device provided in embodiments of the present invention are used to resolve a prior-art technical problem that transmit power of a terminal device cannot be properly used because two base stations cannot coordinate scheduling of the terminal device in a timely manner. According to the power information sending method, the terminal device, and the network device provided in the embodiments of the present invention, the two base stations can exchange scheduling information of the terminal device in real time, so as to ensure that channel power of the terminal device can be properly allocated.

According to a first aspect, an embodiment of the present invention provides a power information sending method. The method includes receiving, by a terminal device in a first downlink subframe of a first carrier, first scheduling grant information sent by a first network device. The first scheduling grant information is used to determine first channel transmit power. The first channel transmit power is channel transmit power in a first uplink subframe of the first carrier. The method also includes sending, by the terminal device, channel power information to a second network device in a second uplink subframe of a second carrier according to the first channel transmit power. The channel power information includes the first channel transmit power or includes power information determined according to the first channel transmit power. The second uplink subframe is located before a second downlink subframe of the second carrier. The second downlink subframe is a subframe for carrying scheduling grant information of at least one third uplink subframe of the second carrier. The at least one third uplink subframe completely overlaps or partially overlaps with the first uplink subframe. The method further includes receiving, by the terminal device, second scheduling grant information in the second downlink subframe. The second scheduling grant information indicates second channel transmit power. The second channel transmit power is channel transmit power in a third uplink subframe of the second carrier.

According to the power information sending method provided in the present invention, after receiving the first scheduling grant information sent by the first network device in the first uplink subframe of the first carrier, the terminal device determines the first channel transmit power of the terminal device in the first uplink subframe, and sends the channel power information determined according to the first channel transmit power to the second network device by using the second uplink subframe located before the second downlink subframe of the second carrier, so that the second network device sends the second scheduling grant information to the terminal device, and the terminal device can accurately perform power allocation. According to the method in this embodiment, two base stations can exchange scheduling information of the terminal device in real time, so as to ensure that channel power of the terminal device can be properly allocated and avoid power compression and an increase in a bit error rate.

With reference to the first aspect, in a first possible implementation of the first aspect, the power information determined according to the first channel transmit power is power headroom information; and before the sending, by the terminal device, channel power information to a second network device in a second uplink subframe of a second carrier according to the channel transmit power, the method further includes: determining, by the terminal device, the power headroom information according to the first channel transmit power, where the power headroom information indicates remaining power of the terminal device.

With reference to the first aspect or the first possible implementation of the first aspect, in a second possible implementation of the first aspect, the method further includes: determining, by the terminal device, the second uplink subframe according to a first timing relationship between the first uplink subframe and the second carrier.

According to a second aspect, an embodiment of the present invention provides a power information sending method. The method includes receiving, by a second network device, channel power information sent by a terminal device in a second uplink subframe of a second carrier. The channel power information includes first channel transmit power or includes power information determined by the terminal device according to the first channel transmit power. The first channel transmit power is channel transmit power of a first network device in a first uplink subframe of a first carrier. The second uplink subframe is located before a second downlink subframe of the second carrier. The second downlink subframe is a subframe for carrying scheduling grant information of at least one third uplink subframe of the second carrier. The at least one third uplink subframe completely overlaps or partially overlaps with the first uplink subframe. The method also includes sending, by the second network device, second scheduling grant information to the terminal device in the second downlink subframe according to the channel power information. The second scheduling grant information indicates second channel transmit power, and the second channel transmit power is channel transmit power in a third uplink subframe of the second carrier.

With reference to the second aspect, in a first possible implementation of the second aspect, the power information determined according to the first channel transmit power is power headroom information, and the power headroom information indicates remaining power of the terminal device.

With reference to the second aspect or the first possible implementation of the second aspect, in a second possible implementation of the second aspect, the second uplink subframe is an uplink subframe determined by the terminal device according to a first timing relationship between the first uplink subframe and the second carrier.

For a beneficial effect of the data transmission method provided in the second aspect and the possible implementations of the second aspect, refer to the beneficial effect brought by the first aspect and the possible implementations of the first aspect. Details are not described herein again.

According to a third aspect, an embodiment of the present invention provides a terminal device. The terminal device includes a receiving module configured to receive, in a first downlink subframe of a first carrier, first scheduling grant information sent by a first network device. The first scheduling grant information is used to determine first channel transmit power, and the first channel transmit power is channel transmit power in a first uplink subframe of the first carrier. The terminal also includes a sending module configured to send channel power information to a second network device in a second uplink subframe of a second carrier according to the first channel transmit power. The channel power information includes the first channel transmit power or includes power information determined according to the first channel transmit power. The second uplink subframe is located before a second downlink subframe of the second carrier. The second downlink subframe is a subframe for carrying scheduling grant information of at least one third uplink subframe of the second carrier. The at least one third uplink subframe completely overlaps or partially overlaps with the first uplink subframe. The receiving module is further configured to receive second scheduling grant information in the second downlink subframe. The second scheduling grant information indicates second channel transmit power, and the second channel transmit power is channel transmit power in a third uplink subframe of the second carrier.

With reference to the third aspect, in a first possible implementation of the third aspect, the power information determined according to the first channel transmit power is power headroom information, and the terminal device further includes a determining module, configured to determine the power headroom information according to the first channel transmit power before the sending module sends the channel power information to the second network device in the second uplink subframe of the second carrier according to the channel transmit power, where the power headroom information indicates remaining power of the terminal device.

With reference to the third aspect or the first possible implementation of the third aspect, in a second possible implementation of the third aspect, the determining module is further configured to determine the second uplink subframe according to a first timing relationship between the first uplink subframe and the second carrier.

For a beneficial effect of the data transmission method provided in the third aspect and the possible implementations of the third aspect, refer to the beneficial effect brought by the first aspect and the possible implementations of the first aspect. Details are not described herein again.

According to a fourth aspect, an embodiment of the present invention provides a network device. The network device includes a receiving module configured to receive channel power information sent by a terminal device in a second uplink subframe of a second carrier. The channel power information includes first channel transmit power or includes power information determined by the terminal device according to the first channel transmit power, and the first channel transmit power is channel transmit power of a first network device in a first uplink subframe of a first carrier. The second uplink subframe is located before a second downlink subframe of the second carrier. The second downlink subframe is a subframe for carrying scheduling grant information of at least one third uplink subframe of the second carrier. The at least one third uplink subframe completely overlaps or partially overlaps with the first uplink subframe. The network device also includes a sending module configured to send second scheduling grant information to the terminal device in the second downlink subframe according to the channel power information. The second scheduling grant information indicates second channel transmit power, and the second channel transmit power is channel transmit power in a third uplink subframe of the second carrier.

With reference to the fourth aspect, in a first possible implementation of the fourth aspect, the power information determined according to the first channel transmit power is power headroom information, and the power headroom information indicates remaining power of the terminal device.

With reference to the fourth aspect or the first possible implementation of the fourth aspect, in a second possible implementation of the fourth aspect, the second uplink subframe is an uplink subframe determined by the terminal device according to a first timing relationship between the first uplink subframe and the second carrier.

For a beneficial effect of the data transmission method provided in the fourth aspect and the possible implementations of the fourth aspect, refer to the beneficial effect brought by the first aspect and the possible implementations of the first aspect. Details are not described herein again.

According to a fifth aspect, an embodiment of the present invention provides a terminal device that includes a receiver, and a transmitter. The receiver is configured to receive, in a first downlink subframe of a first carrier, first scheduling grant information sent by a first network device. The first scheduling grant information is used to determine first channel transmit power, and the first channel transmit power is channel transmit power in a first uplink subframe of the first carrier. The transmitter is configured to send channel power information to a second network device in a second uplink subframe of a second carrier according to the first channel transmit power. The channel power information includes the first channel transmit power or includes power information determined according to the first channel transmit power. The second uplink subframe is located before a second downlink subframe of the second carrier. The second downlink subframe is a subframe for carrying scheduling grant information of at least one third uplink subframe of the second carrier. The at least one third uplink subframe completely overlaps or partially overlaps with the first uplink subframe. The receiver is further configured to receive second scheduling grant information in the second downlink subframe. The second scheduling grant information indicates second channel transmit power. The second channel transmit power is channel transmit power in a third uplink subframe of the second carrier.

With reference to the fifth aspect, in a first possible implementation of the fifth aspect, the power information determined according to the first channel transmit power is power headroom information, and the terminal device further includes a processor, configured to determine the power headroom information according to the first channel transmit power before the transmitter sends the channel power information to the second network device in the second uplink subframe of the second carrier according to the channel transmit power, where the power headroom information indicates remaining power of the terminal device.

With reference to the fifth aspect or the first possible implementation of the fifth aspect, in a second possible implementation of the fifth aspect, the processor is further configured to determine the second uplink subframe according to a first timing relationship between the first uplink subframe and the second carrier.

For a beneficial effect of the data transmission method provided in the fifth aspect and the possible implementations of the fifth aspect, refer to the beneficial effect brought by the first aspect and the possible implementations of the first aspect. Details are not described herein again.

According to a sixth aspect, an embodiment of the present invention provides a network device that includes a receiver and a transmitter. The receiver is configured to receive channel power information sent by a terminal device in a second uplink subframe of a second carrier. The channel power information includes first channel transmit power or includes power information determined by the terminal device according to the first channel transmit power. The first channel transmit power is channel transmit power of a first network device in a first uplink subframe of a first carrier. The second uplink subframe is located before a second downlink subframe of the second carrier. The second downlink subframe is a subframe for carrying scheduling grant information of at least one third uplink subframe of the second carrier. The at least one third uplink subframe completely overlaps or partially overlaps with the first uplink subframe. The transmitter is configured to send second scheduling grant information to the terminal device in the second downlink subframe according to the channel power information. The second scheduling grant information indicates second channel transmit power. The second channel transmit power is channel transmit power in a third uplink subframe of the second carrier.

With reference to the sixth aspect, in a first possible implementation of the sixth aspect, the power information determined according to the first channel transmit power is power headroom information, and the power headroom information indicates remaining power of the terminal device.

With reference to the sixth aspect or the first possible implementation of the sixth aspect, in a second possible implementation of the sixth aspect, the second uplink subframe is an uplink subframe determined by the terminal device according to a first timing relationship between the first uplink subframe and the second carrier.

With reference to the first aspect and the possible implementations of the first aspect, the second aspect and the possible implementations of the second aspect, the third aspect and the possible implementations of the third aspect, the fourth aspect and the possible implementations of the fourth aspect, the fifth aspect and the possible implementations of the fifth aspect, and the sixth aspect and the possible implementations of the sixth aspect, the first scheduling grant information includes at least one of a quantity of resource blocks (RBs) occupied by an uplink data channel of the terminal device in the first uplink subframe, a modulation and coding scheme, or a transmit power control (TPC) command.

With reference to the first aspect and the possible implementations of the first aspect, the second aspect and the possible implementations of the second aspect, the third aspect and the possible implementations of the third aspect, the fourth aspect and the possible implementations of the fourth aspect, the fifth aspect and the possible implementations of the fifth aspect, and the sixth aspect and the possible implementations of the sixth aspect, a length of the first uplink subframe is 1 ms, and lengths of the second uplink subframe and the third uplink subframe are less than or equal to 0.5 ms.

According to the power information sending method, the terminal device, and the network device provided in the present invention, after receiving the first scheduling grant information sent by the first network device in the first uplink subframe of the first carrier, the terminal device determines the first channel transmit power of the terminal device in the first uplink subframe, and sends the channel power information determined according to the first channel transmit power to the second network device by using the second uplink subframe located before the second downlink subframe of the second carrier, so that the second network device sends the second scheduling grant information to the terminal device according to the channel power information, and the terminal device can accurately perform power allocation. According to the method in the embodiments, two base stations can exchange scheduling information of the terminal device in real time, so as to ensure that channel power of the terminal device can be properly allocated and avoid power compression and an increase in a bit error rate.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A network device in this application may be a base station, and the base station may be a device that is in an access network and that communicates, over an air interface, with a wireless terminal by using one or more sectors. The base station may be configured to mutually convert a received over-the-air frame and an IP packet and serve as a router between the wireless terminal and a remaining portion of the access network. The remaining portion of the access network may include an Internet Protocol (IP) network. The base station may further coordinate attribute management of the air interface. For example, the base station may be an evolved NodeB (NodeB or eNB or e-NodeB) in LTE. For example, in some DC scenarios, the base station and a cell group may be interchangeable. For example, a first network device may be a first cell group, and a second network device may be a second cell group. This is not limited in this application.

A terminal device in this application may be a wireless terminal device or a wired terminal device. The wireless terminal may be a handheld device with a wireless connection function, another processing device connected to a wireless modem, or a mobile terminal that communicates with one or more core networks by using a radio access network. For example, the wireless terminal may be a mobile phone (or referred to as a "cellular" phone) or a computer with a mobile terminal. For another example, the wireless terminal may be a portable, pocket-sized, handheld, computer-built-in, or in-vehicle mobile apparatus. For still another example, the wireless terminal may be user equipment (UE).

Figure 1:
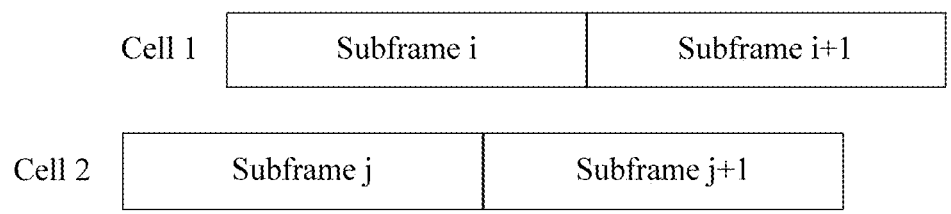
FIG. 1 is a first schematic diagram of uplink subframe overlapping of two different cells according to an embodiment of the present invention.
Figure 2:
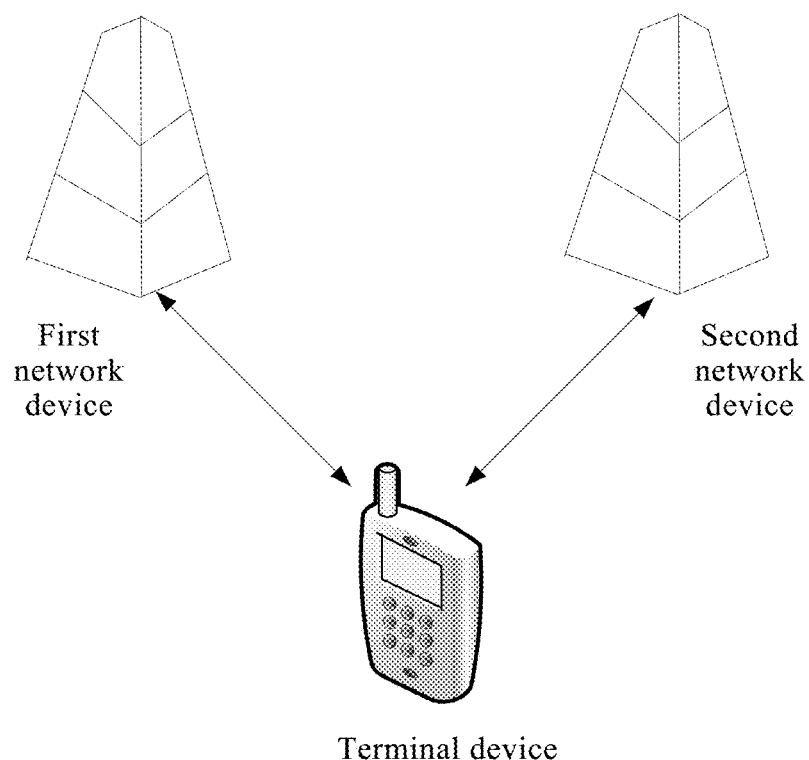
FIG. 2 is a structural diagram of a DC communications system network according to an embodiment of the present invention.

A power information sending method in the embodiments of the present invention can be applied to a DC communications system, or a scenario in which a terminal device is served by two or more network side devices. The DC communications system is used as an example. As shown in FIG. 2, the DC communications system may include a first network device and a second network device. The first network device is corresponding to a carrier group or a cell group, which is referred to as a first carrier. The second network device is corresponding to a carrier group, which is referred to as a second carrier. The terminal device simultaneously communicates with the two network devices on the two carriers. In the DC system, any time difference exists at start moments of downlink transmit subframes of the two network devices. Therefore, in a non-synchronous DC scenario, time may mutually overlap in uplink subframes sent by the terminal device to the two network devices, and total transmit power of the terminal in an uplink subframe of an overlapping part cannot exceed maximum transmit power that can be allowed by UE. However, because of a scheduling policy in the prior art, power of the UE is wasted or total transmit power of the UE exceeds the maximum transmit power allowed by the UE. Consequently, power in an uplink subframe sent later is compressed and a bit error rate increases.

The method in the embodiments of the present invention can be applied to not only the current 2G, 3G, and 4G standards but also the 4.5G and 5G standards. In future network deployment, LTE provides wide coverage as a mature network, and 4.5G or 5G is deployed in a hotspot area as a new network to improve a throughput. Due to a backhaul resource limit, there may be non-ideal backhaul between an LTE base station and a 4.5G/5G base station, and the base stations may serve the UE in a DC manner.

The method in the embodiments of the present invention is intended to resolve a technical problem in a multicarrier system (such as a DC system) that channel power is wasted or a bit error rate increases because a first network device and a second network device cannot coordinate scheduling of UE and channel power of the UE cannot be properly used. It should be understood that the method or the apparatus in the embodiments of the present invention may be further applied to another power allocation or resource allocation scenario. For example, the method and the apparatus in the embodiments of the present invention may be further applied to a case in which UE needs to simultaneously send uplink information to two or more base stations.

Specific embodiments are used below to describe in detail the technical solutions of the present invention. The following several specific embodiments may be combined with each other, and a same or similar concept or process may not be described repeatedly in some embodiments.

Figure 3:
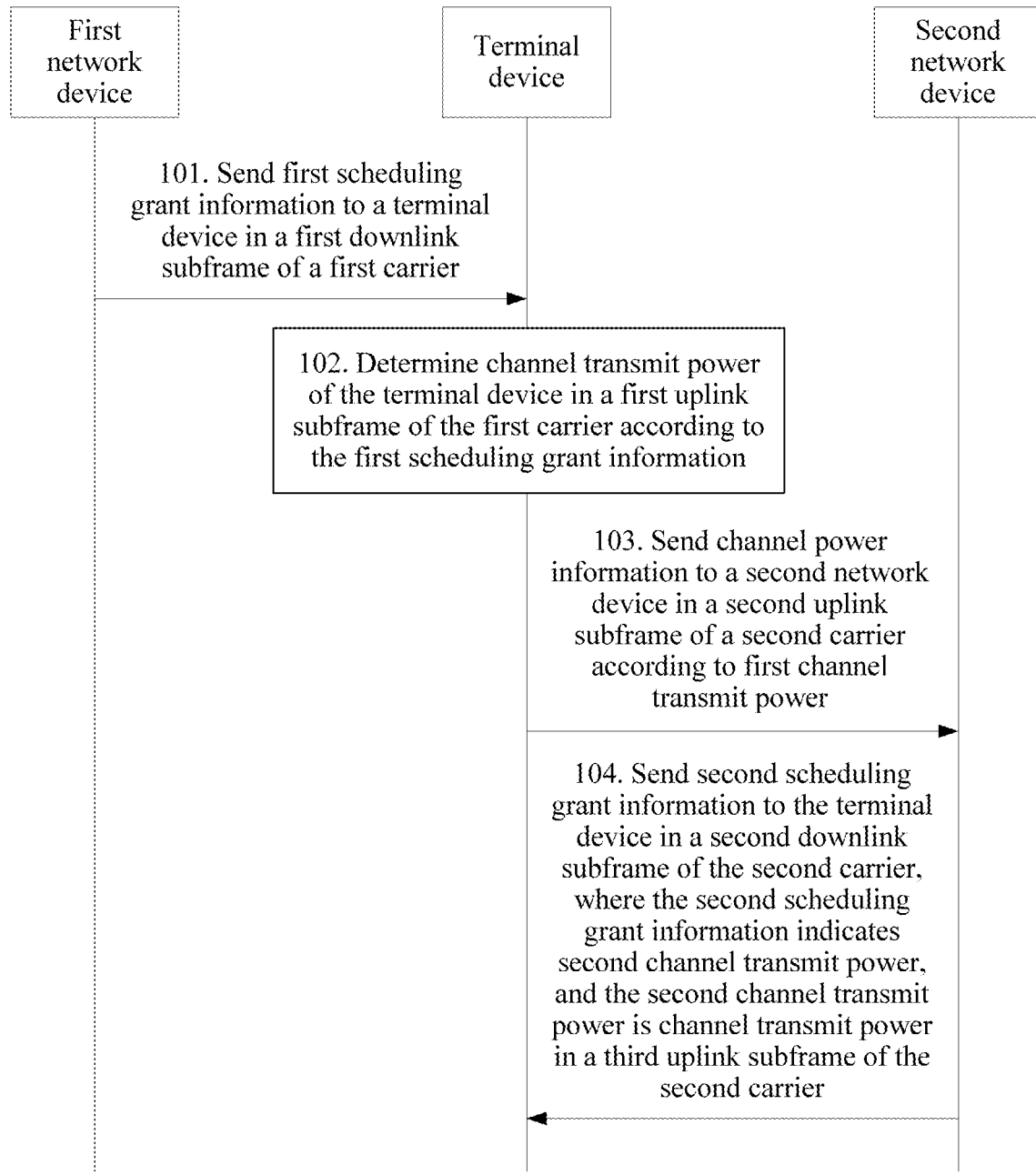
FIG. 3 is a signaling flowchart of Embodiment 1 of a power information sending method according to an embodiment of the present invention.

FIG. 3 is a signaling flowchart of Embodiment 1 of a power information sending method according to an embodiment of the present invention. The method can be applied to the multicarrier system shown in FIG. 2, or a scenario in which a terminal device is served by two or more network side devices. That the method is applied to the multicarrier system shown in FIG. 2 is used as an example. As shown in FIG. 3, the method includes the following steps.

S101: A first network device sends first scheduling grant information to a terminal device in a first downlink subframe of a first carrier.

The first scheduling grant information is used to indicate first channel transmit power, and the first channel transmit power is channel transmit power in a first uplink subframe of the first carrier.

S102: The terminal device determines channel transmit power of the terminal device in a first uplink subframe of the first carrier according to the first scheduling grant information.

Specifically, after receiving the first scheduling grant information sent by the first network device, the terminal device may determine the first channel transmit power of the terminal device in the first uplink subframe according to the first scheduling grant information. It should be understood that in this embodiment, the first scheduling grant information may be signaling or data information, and the first scheduling grant information may alternatively be sent in another message. The first scheduling grant information is used to indicate the first channel transmit power. An indication method may be directly including a power value to the first scheduling grant information or sending an index value or a power range index value. When a specific power value is sent, a technical effect is that the terminal device can be accurately informed, and the terminal device can relatively accurately determine a value of the first channel transmit power. When an index is sent, an air interface resource can be saved, data packet encapsulation can be accelerated, and scheduling efficiency can be further improved. The indication manner may be an implicit indication manner, or the like.

S103: The terminal device sends channel power information to a second network device in a second uplink subframe of a second carrier according to the first channel transmit power.

The channel power information includes the first channel transmit power or includes power information determined according to the first channel transmit power. The second uplink subframe is located before a second downlink subframe of the second carrier, the second downlink subframe is a subframe for carrying second scheduling grant information of at least one third uplink subframe of the second carrier, and the at least one third uplink subframe completely overlaps or partially overlaps with the first uplink subframe. Herein, overlapping may mean that there is an intersection between a time for sending the third uplink subframe and a time for sending the first uplink subframe.

It should be understood that a form of the channel power information is not specifically limited in the present invention. The first scheduling grant information may be directly forwarded in a transparent transmission manner so as to further improve efficiency, or the channel power information is determined according to the first channel transmit power and then the channel power information is sent to the second network device. A manner of determining the channel power information by the terminal device according to the first channel transmit power is not limited in the present invention. The terminal device may determine the channel power information according to a form of the first channel transmit power and an air interface resource or according to a predefined rule. For example, when the air interface resource is relatively strained, the terminal device or the network device may decrease a quantity of bits for representing the channel power information, so that an air interface resource occupied by the channel power information is less than an air interface resource occupied for indicating the first channel transmit power in the first scheduling grant information.

S104: The second network device sends the second scheduling grant information to the terminal device in a second downlink subframe of the second carrier, where the second scheduling grant information indicates second channel transmit power, and the second channel transmit power is channel transmit power in a third uplink subframe of the second carrier.

Specifically, the first uplink subframe of the first network device completely overlaps or partially overlaps with the at least one third uplink subframe of the second carrier of the second network device. Therefore, generally, in a DC system or when another terminal device is served by two or more network side devices, a sum of the first channel transmit power of the terminal device in the first uplink subframe and channel transmit power in the at least one third uplink subframe cannot exceed maximum transmit power that can be allowed by the terminal device. In an optional manner, the channel transmit power of the terminal device in the at least one third uplink subframe may be determined after the second scheduling grant information sent by the second network device in the second downlink subframe is received. In addition, when determining the second scheduling grant information sent to the terminal device, the second network device may determine the second scheduling grant information after receiving the first channel transmit power of the terminal device in the first uplink subframe. In this way, it can be ensured that the sum of the first channel transmit power of the terminal device in the first uplink subframe and the channel transmit power in the at least one third uplink subframe does not exceed the maximum transmit power that can be allowed by the terminal device. Therefore, in this embodiment, after determining the first channel transmit power of the terminal device in the first uplink subframe, optionally, the terminal device may send the first channel transmit power to the second network device in the second uplink subframe of the second carrier, or may determine the channel power information according to the first channel transmit power and send the channel power information to the second network device. Optionally, the channel power information may be any power information that can enable the second network device to send the second scheduling grant information to the terminal device, or may be any information that can enable the second network device to learn of the first channel transmit power of the first network device in the first uplink subframe. Alternatively, the channel power information may be any information that can enable the second network device to determine the channel transmit power of the terminal device in the at least one third uplink subframe that overlaps with the first uplink subframe. For example, the channel power information may be index information, power class information, or the like of the first channel transmit power.

It should be noted that the second uplink subframe that is of the second carrier and in which the terminal device sends the channel power information is located before the second downlink subframe of the second carrier, so that the second network device can receive the channel power information before sending the second scheduling grant information to the terminal device, so as to send accurate second scheduling grant information to the terminal device.

Optionally, the second scheduling grant information sent by the second network device may be determined according to the channel power information or may be determined without the channel power information. For example, the second scheduling grant information may be determined according to a predefined rule. A manner of determining the second scheduling grant information by the second network device is not limited in this embodiment.

Optionally, S105: The terminal device determines channel transmit power in a third uplink subframe.

Specifically, after the terminal device receives the second scheduling grant information sent by the second network device, optionally, the terminal device may determine the channel transmit power of the terminal device in the third uplink subframe according to the second scheduling grant information, or may determine the channel transmit power of the terminal device in the third uplink subframe without the second scheduling grant information. A manner of determining the channel transmit power in the third uplink subframe by the terminal device is not limited in this embodiment. Herein, the terminal device determines channel transmit power in all third uplink subframes that overlap with the first uplink subframe. A sum of the channel transmit power and the first channel transmit power does not exceed the maximum transmit power that can be allowed by the terminal device. Optionally, the second scheduling grant information may be any information that can enable the terminal device to determine the channel transmit power of the terminal device in the third uplink subframe.

According to the power information sending method provided in the present invention, after receiving the first scheduling grant information sent by the first network device in the first uplink subframe of the first carrier, the terminal device determines the first channel transmit power of the terminal device in the first uplink subframe, and sends the channel power information determined according to the first channel transmit power to the second network device by using the second uplink subframe located before the second downlink subframe of the second carrier, so that the second network device sends the second scheduling grant information to the terminal device, and the terminal device can accurately perform power allocation. According to the method in this embodiment, two base stations can exchange scheduling information of the terminal device in real time by using the terminal device, so as to ensure that channel power of the terminal device can be properly allocated and avoid power compression and an increase in a bit error rate.

In a possible implementation of this embodiment of the present invention, the power information determined by the terminal device according to the first channel transmit power is power headroom information. After S102 and before S103, the method may further include: the terminal device determines the power headroom information according to the first channel transmit power, where the power headroom information indicates remaining power of the terminal device.

Specifically, the channel power information may be the power headroom (PH) information determined by the terminal device according to the first channel transmit power. The PH information may be PH of each carrier in the first carrier, and calculation of the PH of each carrier is the same as existing PH calculation. The PH information may be PH calculated according to channel transmit power of all carriers in the first carrier, for example, PH=maximum transmit power of the terminal device−sum of channel power of all the carriers in the first carrier.

Optionally, the first scheduling grant information includes at least one of a quantity of resource blocks (RBs) occupied by an uplink data channel in the first uplink subframe, a modulation and coding scheme, or a TPC command.

In another possible implementation of this embodiment of the present invention, a length of the first uplink subframe is greater than a length of the second uplink subframe. Specifically, the length of the first uplink subframe may be 1 ms, and lengths of the second uplink subframe and the third uplink subframe are less than or equal to 0.5 ms.

To better describe overlapping between the third uplink subframe and the first uplink subframe, a simple schematic diagram of a subframe may be used as an example for description. For example, referring to FIG. 4, that the lengths of the second uplink subframe and the third uplink subframe are 1 ms is used as an example in FIG. 4. Certainly, the overlapping between the third uplink subframe and the first uplink subframe is not limited to the schematic diagram shown in FIG. 4.

Figure 4:
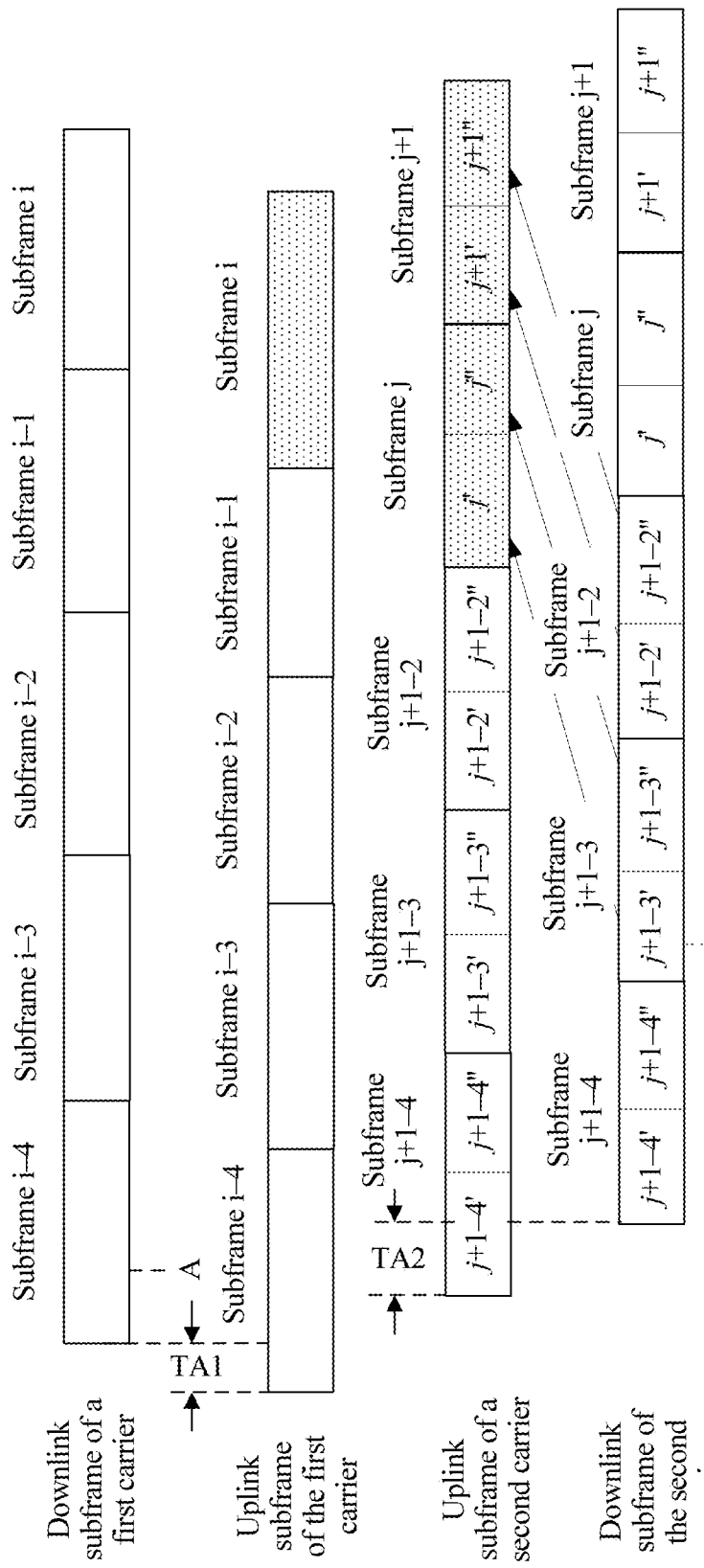
FIG. 4 is a schematic diagram of uplink subframe overlapping of a first carrier and a second carrier according to an embodiment of the present invention.

Specifically, in FIG. 4, the lengths of the second uplink subframe and the third uplink subframe of the second carrier are 0.5 ms, and third uplink subframes of the second carrier that overlap with a first uplink subframe i in FIG. 4 are subframes j', j", j−1', and j+1".

The first network device sends, in a first downlink subframe i-4, first scheduling grant information of the terminal device in the first uplink subframe i to the terminal device, and the terminal device receives the first scheduling grant information at a moment A of the first downlink subframe i-4. Because the length of the third uplink subframe is less than the length of the first uplink subframe, second scheduling grant information of the third uplink subframe j' is scheduled in a second downlink subframe j+1−3'. Therefore, during a time period between the moment A of the first downlink subframe i-4 and the second downlink subframe j+1−3' (there are four subframes between the second downlink subframe j−1−3' and the third uplink subframe j', the second network device sends the second scheduling grant information of the third uplink subframe j' to the terminal device in the second downlink subframe j+1−3', and the terminal device receives the second scheduling grant information at a moment B), the terminal device may determine any uplink subframe corresponding to the time period as a second uplink subframe, and send the foregoing channel power information to the second network device, so that the second network device can send the second scheduling grant information to the terminal device. Optionally, the second network device may learn of first channel power or remaining channel power of the terminal device in the first uplink subframe according to the channel power information sent by the terminal device, and may further send the corresponding second scheduling grant information to the terminal device. According to the method provided in this embodiment of the present invention, two base stations can exchange scheduling information of the terminal device in real time by using the terminal device, so as to ensure that channel power of the terminal device can be properly allocated.

Optionally, the length of the first uplink subframe may be less than 1 ms, and the length of the second uplink subframe should also be less than the length of the first uplink subframe. When the length of the first uplink subframe is 1 ms, the lengths of the second uplink subframe and the third uplink subframe may be 0.2 ms. It should be noted that, regardless of how the length of the first uplink subframe, the length of the second uplink subframe, and the length of the third uplink subframe change, a length of a transmission time interval (TTI) is still equal to a length of a changed subframe. Optionally, in the 4.5G or 5G standard, the lengths of the second uplink subframe and the third uplink subframe may be lengths of one symbol, and a length of a corresponding transmission delay TTI is also a length of one symbol.

Based on the foregoing embodiment, in another possible implementation of this embodiment of the present invention, this embodiment describes a specific process in which the terminal device determines the scheduled second uplink subframe. Further, the method may further include: determining the second uplink subframe according to a first timing relationship between the first uplink subframe and the second carrier. Specifically, the terminal device may determine an uplink subframe in which a determining moment before the first uplink subframe is located as the second uplink subframe. Optionally, the terminal device may determine the second uplink subframe according to a first timing relationship between the first uplink subframe and the first carrier, or the terminal device may determine the second uplink subframe according to a relationship between the first carrier and the second carrier. Specifically, the terminal device may determine a subframe range of the second carrier according to a timing relationship, and then determine the second uplink subframe in the subframe range of the second carrier according to another preset condition.

Optionally, the first timing relationship may be preset by the terminal device or may be configured by the second network device or the first network device for the terminal device. The first timing relationship may be a time difference relationship between the second uplink subframe and the first uplink subframe. That is, after the terminal device receives the first scheduling grant information of the first uplink subframe, the terminal device may subtract a difference k from the first uplink subframe to obtain a location of the second uplink subframe.

Optionally, the first timing relationship may be a time difference relationship between the second uplink subframe and the second carrier. For example, the location of the second uplink subframe may be obtained by subtracting a difference k from a third uplink subframe of the second carrier, or the location of the second uplink subframe may be obtained by subtracting a difference k from a second downlink subframe of the second carrier.

It should be noted that k may be a random value, provided that the second uplink subframe is located before a second downlink uplink subframe for scheduling the second scheduling grant information of the third uplink subframe, that is, provided that the second network device receives the channel power information of the terminal device in the first uplink subframe before determining the channel power of the terminal device in the third uplink subframe.

Another detailed embodiment of the present invention is shown below. It should be understood that the present invention does not limit combination of the foregoing embodiments and logical replacement or combination of steps or apparatuses.

Step 1300: A terminal device receives, in a first downlink subframe of a first carrier, first scheduling grant information sent by a first network device, where the first scheduling grant information is used to determine first channel transmit power, and the first channel transmit power is channel transmit power in a first uplink subframe of the first carrier.

It should be understood that in different scenarios or in systems of different standards, this embodiment of the present invention may have different implementations. This is not limited in the present invention. For example, the first network device and a second network device may be a first terminal and a second terminal, and separately perform a D2D (Device to Device) type connection or a D2D-similar type connection to the terminal device that receives the scheduling grant information. When the terminal device needs to simultaneously send information to the first terminal and the second terminal, and in some cases, the second terminal and a third terminal can communicate with each other only by using the second terminal, uplink power control may be performed by using this embodiment of the present invention. In addition, the first network device and the second network device may be a network device and a third terminal device. With continuous system evolution, one terminal device may be served by at least two network devices. In this case, UE may receive scheduling grant information sent by multiple network devices, whereas a technical solution is similar to that in this embodiment of the present invention.

In an embodiment, the first scheduling grant information may be in a form in another embodiment of the present invention, or may be a power status indication, such as a message indicating a high, medium, or low power state, and is used to indicate a power class, or an indication is sent only in a high, medium, or low power state. For example, when the first network device needs to occupy relatively high power, the grant scheduling information may be sent, or a high class is indicated in a message that carries the scheduling grant information. In another case, this indication is not sent. In this way, a channel resource can be saved. Alternatively, indication may be performed by using k bits, where k is a positive integer. For example, when k=2, a 2-bit indication method is used, and a maximum of four power classes may be indicated by sending 00,01,10,11. Certainly, three power classes may be indicated by using two bits.

Step 1301: The terminal device sends channel power information to a second network device in a second uplink subframe of a second carrier according to the first channel transmit power, where the channel power information includes the first channel transmit power or includes power information determined according to the first channel transmit power, the second uplink subframe is located before a second downlink subframe of the second carrier, the second downlink subframe is a subframe for carrying scheduling grant information of at least one third uplink subframe of the second carrier, and the at least one third uplink subframe completely overlaps or partially overlaps with the first uplink subframe.

In an embodiment, in step 1301, that the terminal device sends channel power information to a second network device in a second uplink subframe of a second carrier according to the first channel transmit power may further include a determining process. Optionally, the power information may be the first scheduling grant information. The terminal device may directly forward or transparently transmit the first scheduling grant information. How to parse an air-interface data packet is not specifically limited in the present invention. The terminal device may parse only a packet header or a packet trailer of a protocol of the data packet, or may directly forward the data packet without parsing or perform complete parsing, or may perform further processing to obtain specific power information. These actions may be performed according to a preset rule, or may be performed by the terminal and the first network device and/or the second network device by means of negotiation. Alternatively, information whose form is the same as or similar to a form of the first scheduling grant information shown in step 1300 may be determined according to the first scheduling grant information, and then step 1301 is performed.

Step 1302: The terminal device receives second scheduling grant information in the second downlink subframe, where the second scheduling grant information indicates second channel transmit power, and the second channel transmit power is channel transmit power in a third uplink subframe of the second carrier.

It should be understood that in step 1301, the second uplink subframe should be located before the second downlink subframe of the second carrier. The power information may be sent to the second network device by performing step 1301. In an embodiment, the second network device may determine, according to some conditions or interaction signaling, whether to determine the second scheduling grant information according to the power information. In an embodiment, the second network device determines a determining time. When the second channel transmit power cannot be determined according to the power information within the determining time, the second network device determines the second channel transmit power without the power information. When the second channel transmit power can be determined according to the power information within the determining time, the second network device determines the second channel transmit power according to the power information. In some scenarios, the present invention can achieve a good effect. Two implementation scenarios are used as an example below. It should be understood that the present invention is not limited to only the following two implementation scenarios.

Implementation Scenario 1.

First grant information is used to indicate the transmit power in the first uplink subframe, and second grant information indicates the channel transmit power in the third uplink subframe. Generally, there are α subframes in time between the first grant information and the first uplink subframe, and there are β subframes in time between the second grant information and the third subframe. For ease of understanding and being close to an actual scenario, in the implementation scenario 1, a value of α and a value of β are the same. That is, for example, if the first grant information indicates a first uplink subframe after four subframes, the second grant information also indicates a third subframe after four subframes. Based on the foregoing premise, specifically, in the implementation scenario 1, a length of a subframe of the first carrier may be greater than a length of a subframe of the second carrier. Because the terminal device may receive the first scheduling grant information in step 1300 and then perform step 1301, when the length of the subframe of the first carrier is greater than the length of the subframe of the second carrier and an advanced scheduling time difference is large enough, it can be ensured that the second uplink subframe is located before the second downlink subframe of the second carrier.

Implementation Scenario 2.

First grant information is used to indicate the transmit power in the first uplink subframe, and second grant information indicates the channel transmit power in the third subframe. Generally, there are α subframes in time between the first grant information and the first uplink subframe, and there are β subframes in time between the second grant information and the third subframe. To achieve an effect of the present invention, a value of α may be different from a value of β. That is, for example, if the first grant information indicates a first uplink subframe after four subframes, the second grant information indicates a third subframe after two subframes. Based on the foregoing premise, specifically, in the implementation scenario 2, a length of a subframe of the first carrier may be equal to or less than a length of a subframe of the second carrier. Because the terminal device may receive the first scheduling grant information in step 1300 and then perform step 1301, and the first uplink subframe after four subframes that is indicated by the first grant information is less than the third subframe after two subframes that is indicated by the second grant information, after the terminal device receives the first grant information, it is ensured that the second uplink subframe is located before the second downlink subframe of the second carrier. Certainly, if the length of the subframe of the first carrier may be greater than the length of the subframe of the second carrier, provided that a difference between α and β is proper enough, it can be ensured that the second uplink subframe is located before the second downlink subframe of the second carrier.

Based on the foregoing implementation scenario 1 and implementation scenario 2, in another scenario, it can also be ensured that step 1300 is performed first and then step 1301 is performed. The value of α and the value of β can ensure that the second uplink subframe is located before the second downlink subframe of the second carrier. In an embodiment, the terminal device determines the second uplink subframe according to a first timing relationship between the first uplink subframe and the second carrier. The timing relationship may be determined according to the first downlink subframe, such as a subframe corresponding to a moment after the first downlink subframe or a subframe after the first downlink subframe, or may be determined according to a preset sending moment of the second downlink subframe. The timing relationship is determined according to a determined subframe corresponding to a moment before receiving the second downlink subframe or according to a determined subframe before sending the second downlink subframe. Alternatively, the timing relationship may be determined according to the first uplink subframe and/or the third uplink subframe, and a determining manner is similar to that in the foregoing two examples. That is, the timing relationship is determined according to a subframe corresponding to a moment before the first uplink subframe and/or the third uplink subframe or according to a subframe before the first uplink subframe and/or the third uplink subframe. Details are not described in the present invention. Alternatively, the timing relationship may be determined according to two or more of the foregoing subframes. For example, a range is determined according to a moment after the first downlink subframe, a range before the second downlink subframe or the first uplink subframe or the third uplink subframe is determined, an intersection is taken from the two ranges, and the second uplink subframe is determined in the intersection.

In an embodiment, the power information determined according to the first channel transmit power is power headroom information. Before the terminal device sends the channel power information to the second network device in the second uplink subframe of the second carrier according to the channel transmit power, the method further includes: the terminal device determines the power headroom information according to the first channel transmit power, where the power headroom information indicates remaining power of the terminal device.

In an embodiment, the first scheduling grant information includes at least one of a quantity of resource blocks (RBs) occupied by an uplink data channel in the first uplink subframe, a modulation and coding scheme, or a transmit power control (TPC) command.

Figure 5:
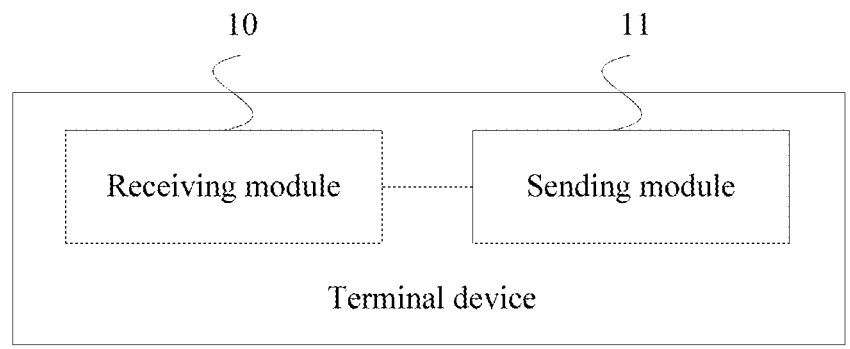
FIG. 5 is a schematic structural diagram of Embodiment 1 of a terminal device according to an embodiment of the present invention.

FIG. 5 is a schematic structural diagram of Embodiment 1 of a terminal device according to an embodiment of the present invention. A part or all of the terminal device shown in FIG. 5 may be implemented in a form of software or hardware, or a part or all of the terminal device shown in FIG. 5 may be implemented by combining software with hardware. As shown in FIG. 5, the terminal device includes a receiving module 10 and a sending module 11.

The receiving module 10 is configured to receive, in a first downlink subframe of a first carrier, first scheduling grant information sent by a first network device, where the first scheduling grant information is used to determine first channel transmit power, and the first channel transmit power is channel transmit power in a first uplink subframe of the first carrier.

The sending module 11 is configured to send channel power information to a second network device in a second uplink subframe of a second carrier according to the first channel transmit power, where the channel power information includes the first channel transmit power or includes power information determined according to the first channel transmit power.

The second uplink subframe is located before a second downlink subframe of the second carrier, the second downlink subframe is a subframe for carrying scheduling grant information of at least one third uplink subframe of the second carrier, and the at least one third uplink subframe completely overlaps or partially overlaps with the first uplink subframe.

The receiving module 10 is further configured to receive second scheduling grant information in the second downlink subframe, where the second scheduling grant information indicates second channel transmit power, and the second channel transmit power is channel transmit power in a third uplink subframe of the second carrier.

In FIG. 5, the sending module 11 and the receiving module 10 may be a transceiver chip or a transceiver circuit with a sending function and a receiving function, or may be a transceiver chip or a transceiver circuit that integrates a sending function, a receiving function, and a part of processing functions. The part of processing functions includes functions such as modulation, demodulation, encoding, decoding, scrambling, and descrambling.

The terminal device provided in this embodiment of the present invention may execute the foregoing method embodiment. An implementation principle and a technical effect of this embodiment are similar to those of the foregoing method embodiment, and details are not described herein again.

Figure 6:
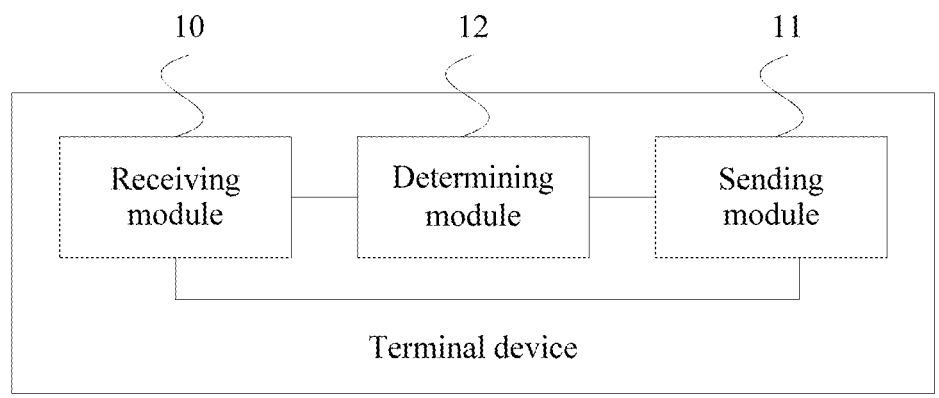
FIG. 6 is a schematic structural diagram of Embodiment 2 of a terminal device according to an embodiment of the present invention.

FIG. 6 is a schematic structural diagram of Embodiment 2 of a terminal device according to an embodiment of the present invention. Based on the foregoing embodiment, the power information determined according to the first channel transmit power is power headroom information. Further, based on the embodiment shown in FIG. 5, the terminal device may further include a determining module 12.

The determining module 12 is configured to determine the power headroom information according to the first channel transmit power before the sending module 11 sends the channel power information to the second network device in the second uplink subframe of the second carrier according to the channel transmit power, where the power headroom information indicates remaining power of the terminal device.

Further, the determining module 12 is further configured to determine the second uplink subframe according to a first timing relationship between the first uplink subframe and the second carrier.

Optionally, the first scheduling grant information includes at least one of a quantity of resource blocks (RBs) occupied by an uplink data channel in the first uplink subframe, a modulation and coding scheme, or a transmit power control (TPC) command.

Optionally, a length of the first uplink subframe is 1 ms, and lengths of the second uplink subframe and the third uplink subframe are less than or equal to 0.5 ms.

The terminal device provided in this embodiment of the present invention may execute the foregoing method embodiment. An implementation principle and a technical effect of this embodiment are similar to those of the foregoing method embodiment, and details are not described herein again.

Figure 7:
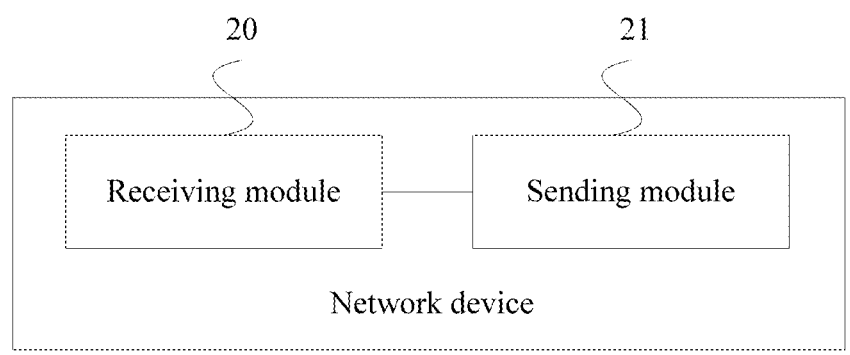
FIG. 7 is a schematic structural diagram of Embodiment 1 of a network device according to an embodiment of the present invention.

FIG. 7 is a schematic structural diagram of Embodiment 1 of a network device according to an embodiment of the present invention. A part or all of the network device shown in FIG. 7 may be implemented in a form of software or hardware, or a part or all of the network device shown in FIG. 7 may be implemented by combining software with hardware. As shown in FIG. 7, the network device may include a receiving module 20 and a sending module 21.

The receiving module 20 is configured to receive channel power information sent by a terminal device in a second uplink subframe of a second carrier, where the channel power information includes first channel transmit power or includes power information determined by the terminal device according to the first channel transmit power, and the first channel transmit power is channel transmit power of a first network device in a first uplink subframe of a first carrier.

The second uplink subframe is located before a second downlink subframe of the second carrier, the second downlink subframe is a subframe for carrying scheduling grant information of at least one third uplink subframe of the second carrier, and the at least one third uplink subframe completely overlaps or partially overlaps with the first uplink subframe.

The sending module 21 is configured to send second scheduling grant information to the terminal device in the second downlink subframe according to the channel power information, where the second scheduling grant information indicates second channel transmit power, and the second channel transmit power is channel transmit power in a third uplink subframe of the second carrier.

In FIG. 7, the sending module 21 and the receiving module 20 may be a transceiver chip or a transceiver circuit with a sending function and a receiving function, or may be a transceiver chip or a transceiver circuit that integrates a sending function, a receiving function, and a part of processing functions. The part of processing functions includes functions such as modulation, demodulation, encoding, decoding, scrambling, and descrambling.

The network device provided in this embodiment of the present invention may execute the foregoing method embodiment. An implementation principle and a technical effect of this embodiment are similar to those of the foregoing method embodiment, and details are not described herein again.

Further, the power information determined according to the first channel transmit power is power headroom information, and the power headroom information indicates remaining power of the terminal device.

The second uplink subframe is an uplink subframe determined by the terminal device according to a first timing relationship between the first uplink subframe and the second carrier.

Optionally, the first scheduling grant information includes at least one of a quantity of resource blocks (RBs) occupied by an uplink data channel of the terminal device in the first uplink subframe, a modulation and coding scheme, or a transmit power control (TPC) command.

Optionally, a length of the first uplink subframe is 1 ms, and lengths of the second uplink subframe and the third uplink subframe are less than or equal to 0.5 ms.

The network device provided in this embodiment of the present invention may execute the foregoing method embodiment. An implementation principle and a technical effect of this embodiment are similar to those of the foregoing method embodiment, and details are not described herein again.

Figure 8:
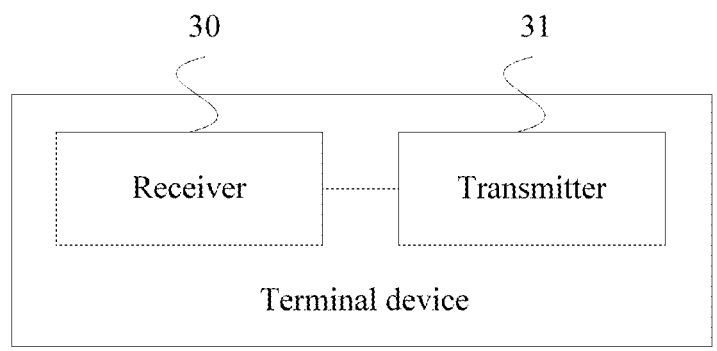
FIG. 8 is a schematic structural diagram of Embodiment 3 of a terminal device according to an embodiment of the present invention.

FIG. 8 is a schematic structural diagram of Embodiment 3 of a terminal device according to an embodiment of the present invention. As shown in FIG. 8, the terminal device includes a receiver 30 and a transmitter 31.

The receiver 30 is configured to receive, in a first downlink subframe of a first carrier, first scheduling grant information sent by a first network device, where the first scheduling grant information is used to determine first channel transmit power, and the first channel transmit power is channel transmit power in a first uplink subframe of the first carrier.

The transmitter 31 is configured to send channel power information to a second network device in a second uplink subframe of a second carrier according to the first channel transmit power, where the channel power information includes the first channel transmit power or includes power information determined according to the first channel transmit power.

The second uplink subframe is located before a second downlink subframe of the second carrier, the second downlink subframe is a subframe for carrying scheduling grant information of at least one third uplink subframe of the second carrier, and the at least one third uplink subframe completely overlaps or partially overlaps with the first uplink subframe.

The receiver 30 is further configured to receive second scheduling grant information in the second downlink subframe, where the second scheduling grant information indicates second channel transmit power, and the second channel transmit power is channel transmit power in a third uplink subframe of the second carrier.

The terminal device provided in this embodiment of the present invention may execute the foregoing method embodiment. An implementation principle and a technical effect of this embodiment are similar to those of the foregoing method embodiment, and details are not described herein again.

Figure 9:
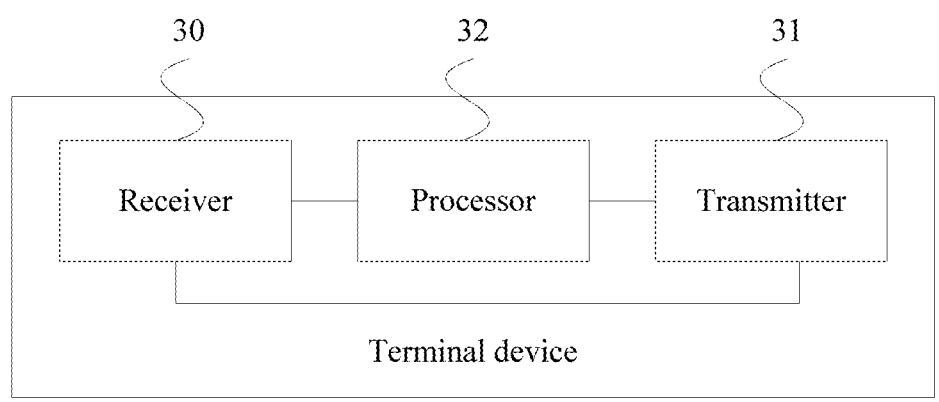
FIG. 9 is a schematic structural diagram of Embodiment 4 of a terminal device according to an embodiment of the present invention.

FIG. 9 is a schematic structural diagram of Embodiment 4 of a terminal device according to an embodiment of the present invention. Based on the foregoing embodiment shown in FIG. 8, the power information determined according to the first channel transmit power is power headroom information. Further, the terminal device may further include a processor 32.

The processor 32 is configured to determine the power headroom information according to the first channel transmit power before the transmitter 31 sends the channel power information to the second network device in the second uplink subframe of the second carrier according to the channel transmit power, where the power headroom information indicates remaining power of the terminal device.

The processor 32 may be further configured to determine the second uplink subframe according to a first timing relationship between the first uplink subframe and the second carrier.

Optionally, the first scheduling grant information includes at least one of a quantity of resource blocks (RBs) occupied by an uplink data channel in the first uplink subframe, a modulation and coding scheme, or a transmit power control (TPC) command.

Optionally, a length of the first uplink subframe is 1 ms, and lengths of the second uplink subframe and the third uplink subframe are less than or equal to 0.5 ms.

The terminal device provided in this embodiment of the present invention may execute the foregoing method embodiment. An implementation principle and a technical effect of this embodiment are similar to those of the foregoing method embodiment, and details are not described herein again.

Figure 10:
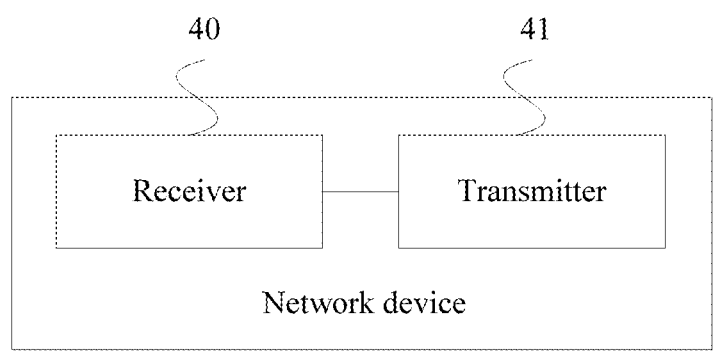
FIG. 10 is a schematic structural diagram of Embodiment 2 of a network device according to an embodiment of the present invention.

FIG. 10 is a schematic structural diagram of Embodiment 2 of a network device according to an embodiment of the present invention. As shown in FIG. 10, the network device may include a receiver 40 and a transmitter 41.

The receiver 40 is configured to receive channel power information sent by a terminal device in a second uplink subframe of a second carrier, where the channel power information includes first channel transmit power or includes power information determined by the terminal device according to the first channel transmit power, and the first channel transmit power is channel transmit power in a first uplink subframe of a first carrier.

The second uplink subframe is located before a second downlink subframe of the second carrier, the second downlink subframe is a subframe for carrying scheduling grant information of at least one third uplink subframe of the second carrier, and the at least one third uplink subframe completely overlaps or partially overlaps with the first uplink subframe.

The transmitter 41 is configured to send second scheduling grant information to the terminal device in the second downlink subframe according to the channel power information, where the second scheduling grant information indicates second channel transmit power, and the second channel transmit power is channel transmit power in a third uplink subframe of the second carrier.

The network device provided in this embodiment of the present invention may execute the foregoing method embodiment. An implementation principle and a technical effect of this embodiment are similar to those of the foregoing method embodiment, and details are not described herein again.

Further, the power information determined according to the first channel transmit power is power headroom information, and the power headroom information indicates remaining power of the terminal device.

Still further, the second uplink subframe is an uplink subframe determined by the terminal device according to a first timing relationship between the first uplink subframe and the second carrier.

Optionally, the first scheduling grant information includes at least one of a quantity of resource blocks (RBs) occupied by an uplink data channel of the terminal device in the first uplink subframe, a modulation and coding scheme, or a transmit power control (TPC) command.

Optionally, a length of the first uplink subframe is 1 ms, and lengths of the second uplink subframe and the third uplink subframe are less than or equal to 0.5 ms.

The network device provided in this embodiment of the present invention may execute the foregoing method embodiment. An implementation principle and a technical effect of this embodiment are similar to those of the foregoing method embodiment, and details are not described herein again.

Figure 11:
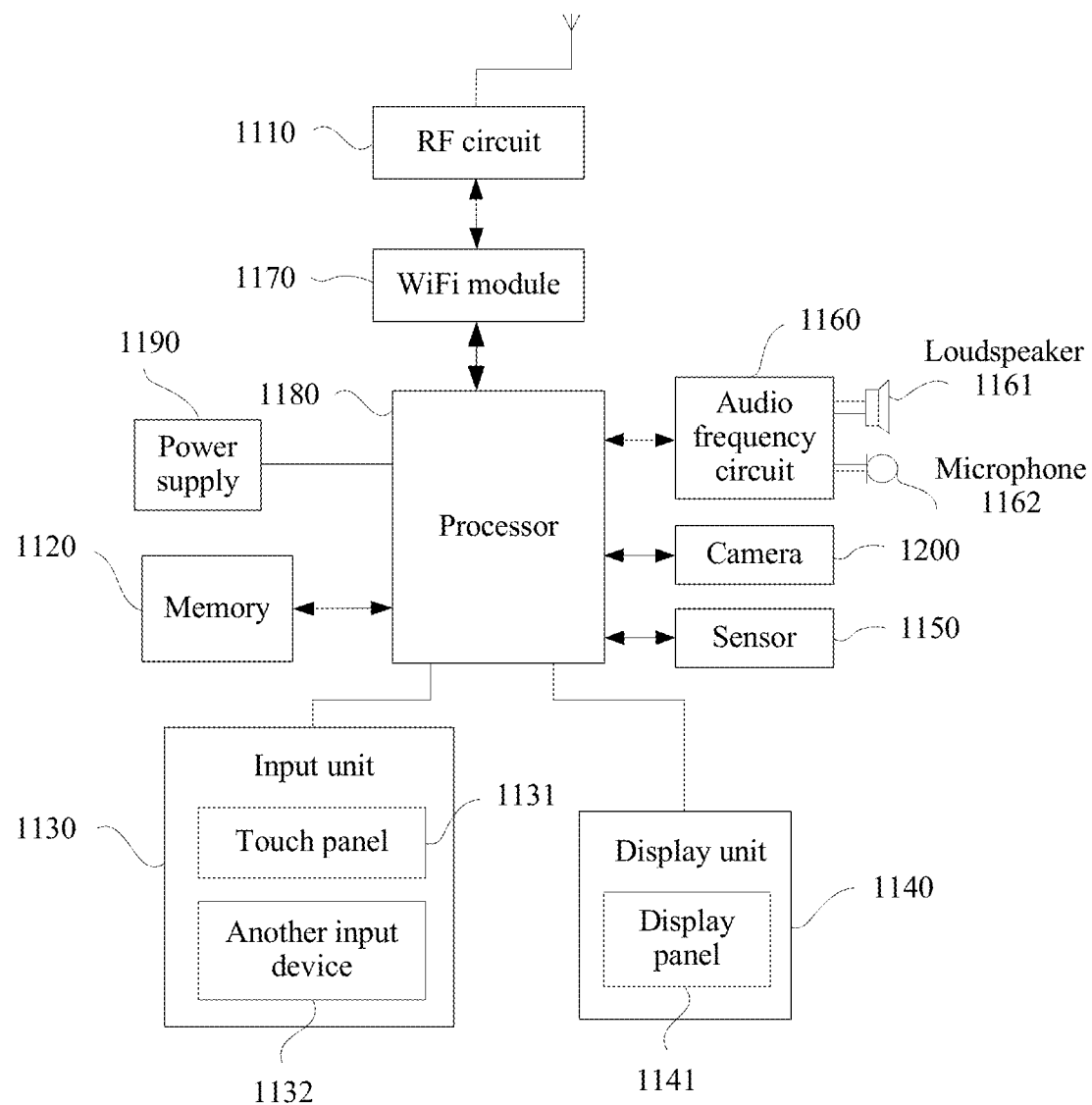
FIG. 11 is a schematic structural diagram of a mobile phone according to an embodiment of the present invention.

As described in the foregoing embodiments, a terminal device in the embodiments of the present invention may be a wireless communications terminal. Therefore, in an example in which the terminal device is a mobile phone, FIG. 11 shows a block diagram of a partial structure when the terminal device provided in the embodiments of the present invention is a mobile phone. Referring to FIG. 11, the mobile phone includes components such as a radio frequency (RF) circuit 1110, a memory 1120, an input unit 1130, a display unit 1140, a sensor 1150, an audio frequency circuit 1160, a Wireless Fidelity (WiFi) module 1170, a processor 1180, and a power supply 1190. A person skilled in the art may understand that, the structure of the mobile phone shown in FIG. 11 does not constitute a limitation on the mobile phone, and the mobile phone may include more or fewer components than those shown in the diagram, or combine some components, or have different component configurations.

In the following, all components of the mobile phone are described in detail with reference to FIG. 11.

The RF circuit 1110 may be configured to receive and send information, or receive and send a signal during a call. In particular, after receiving downlink information from a base station, the RF circuit 1110 sends the downlink information to the processor 1180 for processing. In addition, the RF circuit 1110 sends uplink data to the base station. Generally, the RF circuit includes but is not limited to an antenna, at least one amplifier, a transceiver, a coupler, a low noise amplifier (Low Noise Amplifier, LNA), a duplexer, and the like. In addition, the RF circuit 1110 may further communicate with a network and another device by means of wireless communication. The foregoing wireless communication may use any communications standard or protocol, including but not limited to a Global System for Mobile Communications (GSM), a general packet radio service (GPRS), Code Division Multiple Access (CDMA), Wideband Code Division Multiple Access (WCDMA), Long Term Evolution (LTE), an email, a short message service (SMS), or the like.

The memory 1120 may be configured to store a software program and a module. By running the software program and the module that are stored in the memory 1120, the processor 1180 performs various function applications of the mobile phone and data processing. The memory 1120 may mainly include a program storage area and a data storage area. The program storage area may store an operating system, an application program required by at least one function (such as a sound play function or an image play function), or the like. The data storage area may store data (such as audio data or a phone book) created according to use of the mobile phone, or the like. In addition, the memory 1120 may include a high-speed random access memory, and may further include a nonvolatile memory, such as at least one magnetic disk storage device, a flash storage device, or another volatile solid-state storage device.

The input unit 1130 may be configured to: receive entered digit or character information, and generate key-signal input related to user setting and function control of the mobile phone 1100. Specifically, the input unit 1130 may include a touch panel 1131 and another input device 1132. The touch panel 1131 is also referred to as a touchscreen, and can collect a touch operation (for example, an operation of a user on the touch panel 1131 or near the touch panel 1131 by using any proper object or accessory such as a finger or a stylus) of the user on or near the touch panel 1131, and drive a corresponding connected apparatus according to a preset program. Optionally, the touch panel 1131 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into touch point coordinates, and sends the touch point coordinates to the processor 1180, and can receive and execute a command sent by the processor 1180. In addition, the touch panel 1131 may be implemented in multiple types, such as a resistive type, a capacitive type, an infrared ray, and a surface acoustic wave. In addition to the touch panel 1131, the input unit 1130 may include the another input device 1132. Specifically, the another input device 1132 may include but is not limited to one or more of a physical keyboard, a function key (such as a volume control key or an on/off key), a trackball, a mouse, a joystick, or the like.

The display unit 1140 may be configured to display information entered by the user or information provided for the user and various menus of the mobile phone. The display unit 1140 may include a display panel 1141. Optionally, the display panel 1141 may be configured by using a liquid crystal display (LCD), an organic light-emitting diode (OLED), or the like. Further, the touch panel 1131 may cover the display panel 1141. When detecting a touch operation on or near the touch panel 1131, the touch panel 1131 transmits the touch operation to the processor 1180 to determine a type of a touch event, and then the processor 1180 provides corresponding visual output on the display panel 1141 according to the type of the touch event. In FIG. 11, although the touch panel 1131 and the display panel 1141 are used as two independent components to implement input and output functions of the mobile phone, in some embodiments, the touch panel 1131 and the display panel 1141 may be integrated to implement the input and output functions of the mobile phone.

The mobile phone may further include at least one sensor 1150, such as a light sensor, a motion sensor, or another sensor. Specifically, the light sensor may include an ambient light sensor and a proximity sensor. The ambient light sensor may adjust luminance of the display panel 1141 according to brightness or dimness of ambient light, and the light sensor may turn off the display panel 1141 and/or backlight when the mobile phone moves to an ear. As one type of the motion sensor, an acceleration sensor may detect an acceleration value in each direction (generally three axes), and detect a value and a direction of gravity when the acceleration sensor is stationary, and may be applied to an application used for identifying a mobile phone posture (for example, screen switching between landscape and portrait modes, a related game, or magnetometer posture calibration), a function related to vibration identification (such as a pedometer or a knock), and the like. Other sensors such as a gyroscope, a barometer, a hygrometer, a thermometer, and an infrared sensor may also be disposed on the mobile phone, and details are not described herein.

The audio frequency circuit 1160, a loudspeaker 1161, and a microphone 1162 may provide an audio interface between the user and the mobile phone. The audio frequency circuit 1160 may transmit, to the speaker 1161, an electrical signal converted from received audio data, and the speaker 1161 converts the electrical signal into a sound signal for output. In addition, the microphone 1162 converts a collected sound signal into an electrical signal, the audio frequency circuit 1160 receives the electrical signal, converts the electrical signal into audio data, and outputs the audio data to the processor 1180 for processing. Then the audio data is sent to, for example, another mobile phone, by using the RF circuit 1110, or the audio data is output to the memory 1120 for further processing.

WiFi is a short-distance wireless transmission technology. The mobile phone may help, by using the WiFi module 1170, the user receive and send an email, browse a web page, access streaming media, and the like. The WiFi module 1170 provides wireless broadband Internet access for the user. Although the WiFi module 1170 is shown in FIG. 11, it may be understood that the WiFi module 1170 is not a mandatory component of the mobile phone, and may be totally omitted as required without changing the essence of the present invention.

The processor 1180 is a control center of the mobile phone, and uses various interfaces and lines to connect all parts of the entire mobile phone, and performs various functions of the mobile phone and data processing by running or executing the software program and/or the module stored in the memory 1120 and invoking data stored in the memory 1120, so as to perform overall monitoring on the mobile phone. Optionally, the processor 1180 may include one or more processing units. An application processor and a modem processor may be integrated into the processor 1180. The application processor mainly processes an operating system, a user interface, an application program, and the like. The modem processor mainly processes wireless communication. It may be understood that the modem processor may not be integrated into the processor 1180.

The mobile phone further includes the power supply 1190 (such as a battery) that supplies power to each component. The power supply may be logically connected to the processor 1180 by using a power management system, so as to implement functions such as charging management, discharging management, and power consumption management by using the power management system.

The mobile phone may further include a camera 1200. The camera may be a front-facing camera, or may be a rear-facing camera. Although not shown, the mobile phone may further include a Bluetooth module, a GPS module, and the like, and details are not described herein.

In this embodiment of the present invention, the processor 1180 included in the mobile phone may be configured to execute the foregoing method embodiment. An implementation principle and a technical effect of this embodiment are similar to those of the foregoing method embodiment, and details are not described herein again.

It should be understood that the embodiments may be combined with each other. An example in which the embodiments of a terminal device are combined with each other is provided below. A receiving unit may execute a receiving process of the terminal device in step S101, a determining unit may perform step S102, a sending unit may perform step S103, and the receiving unit may further perform step S104. A second network device may also include a corresponding unit for performing steps of the embodiment shown in FIG. 3. It should be understood that the receiving unit and/or the sending unit may be an antenna or a transceiver, or the receiving unit may be specifically an antenna or a receiver and the sending unit may be an antenna or a transmitter. The determining unit may be a processor or a combination of multiple processors. The second network device may alternatively include a receiver, a transmitter, a processor, or a combination thereof to implement the steps of the embodiment shown in FIG. 3.

A person of ordinary skill in the art may understand that all or some of the steps of the method embodiments may be implemented by a program instructing relevant hardware.

The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
   receiving, by a terminal device, in a first downlink subframe of a first carrier, first scheduling grant information sent by a first network device, wherein the first scheduling grant information determines first channel transmit power, and the first channel transmit power is channel transmit power in a first uplink subframe of the first carrier;
   sending, by the terminal device, channel power information to a second network device, in a second uplink subframe of a second carrier, according to the first channel transmit power, wherein the channel power information comprises the first channel transmit power or comprises power information determined according to the first channel transmit power, and wherein the second uplink subframe is located before a second downlink subframe of the second carrier, the second downlink subframe is a subframe for carrying scheduling grant information of a third uplink subframe of the second carrier, and the third uplink subframe completely overlaps or partially overlaps with the first uplink subframe; and
   receiving, by the terminal device, second scheduling grant information, in the second downlink subframe, wherein the second scheduling grant information indicates second channel transmit power, and the second channel transmit power is the channel transmit power in the third uplink subframe of the second carrier.

2. The method according to claim 1, wherein, when the power information is determined according to the first channel transmit power, the power information is power headroom information; and
   before sending channel power information to a second network device, the method further comprises determining, by the terminal device, the power headroom information according to the first channel transmit power, wherein the power headroom information indicates remaining power of the terminal device after the first channel transmit power is subtracted from a maximum transmit power of the terminal device.

3. The method according to claim 1, wherein the method further comprises
   determining, by the terminal device, the second uplink subframe according to a first timing relationship between the first uplink subframe and the second carrier.

4. The method according to claim 1, wherein the first scheduling grant information comprises a quantity of resource blocks (RBs) occupied by an uplink data channel in the first uplink subframe, a modulation and coding scheme, or a transmit power control (TPC) command.

5. The method according to claim 1, wherein a length of the first uplink subframe is 1 ms, and wherein a length of the second uplink subframe is less than or equal to 0.5 ms and a length of the third uplink subframe is less than or equal to 0.5 ms.

6. A method, comprising:
   receiving, by a second network device, channel power information sent by a terminal device in a second uplink subframe of a second carrier, wherein the channel power information comprises first channel transmit power or comprises power information determined by the terminal device according to the first channel transmit power, and the first channel transmit power is channel transmit power of the terminal device in a first uplink subframe of a first carrier, and wherein the second uplink subframe is located before a second downlink subframe of the second carrier, the second downlink subframe is a subframe for carrying scheduling grant information of a third uplink subframe of the second carrier, and the third uplink subframe completely overlaps or partially overlaps with the first uplink subframe; and
   sending, by the second network device, second scheduling grant information to the terminal device in the second downlink subframe according to the channel power information, wherein the second scheduling grant information indicates second channel transmit power, and the second channel transmit power is the channel transmit power in the third uplink subframe of the second carrier.

7. The method according to claim 6, wherein when the power information is determined according to the first channel transmit power, the power information comprises power headroom information, and the power headroom information indicates remaining power of the terminal device after the first channel transmit power is subtracted from a maximum transmit power of the terminal device.

8. The method according to claim 6, wherein the second uplink subframe is an uplink subframe determined by the terminal device according to a first timing relationship between the first uplink subframe and the second carrier.

9. The method according to claim 6, wherein the second scheduling grant information comprises a quantity of resource blocks occupied by an uplink data channel of the terminal device in the first uplink subframe, a modulation and coding scheme, or a transmit power control (TPC) command.

10. The method according to claim 6, wherein a length of the first uplink subframe is 1 ms, and wherein a length of the second uplink subframe is less than or equal to 0.5 ms and a length of the third uplink subframe is less than or equal to 0.5 ms.

11. A terminal device, comprising:
    a receiver, configured to receive, in a first downlink subframe of a first carrier, first scheduling grant information sent by a first network device, wherein the first scheduling grant information determines first channel transmit power, and the first channel transmit power is channel transmit power in a first uplink subframe of the first carrier; and
    a transmitter, configured to send channel power information to a second network device in a second uplink subframe of a second carrier according to the first channel transmit power, wherein the channel power information comprises the first channel transmit power or comprises power information determined according to the first channel transmit power, and wherein the second uplink subframe is located before a second downlink subframe of the second carrier, the second downlink subframe is a subframe for carrying scheduling grant information of a third uplink subframe of the second carrier, and the third uplink subframe completely overlaps or partially overlaps with the first uplink subframe; and the receiver is further configured to receive second scheduling grant information in the second downlink subframe, wherein the second scheduling grant information indicates second channel transmit power, and the second channel transmit power is the channel transmit power in the third uplink subframe of the second carrier.

12. The terminal device according to claim 11, wherein, when the power information is determined according to the first channel transmit power, the power information is power headroom information, the terminal device further comprises a processor, configured to determine the power headroom information according to the first channel transmit power before the transmitter sends the channel power information to the second network device in the second uplink subframe of the second carrier according to the channel transmit power, wherein the power headroom information indicates remaining power of the terminal device after the first channel transmit power is subtracted from a maximum transmit power of the terminal device.

13. The terminal device according to claim 12, wherein the processor is further configured to determine the second uplink subframe according to a first timing relationship between the first uplink subframe and the second carrier.

14. The terminal device according to claim 12, wherein the first scheduling grant information comprises a quantity of resource blocks occupied by an uplink data channel in the first uplink subframe, a modulation and coding scheme, or a transmit power control (TPC) command.

15. The terminal device according to claim 12, wherein a length of the first uplink subframe is 1 ms, and wherein a length of the second uplink subframe is less than or equal to 0.5 ms and a length of the third uplink subframe is less than or equal to 0.5 ms.

16. A network device, comprising:
a receiver, configured to receive channel power information sent by a terminal device in a second uplink subframe of a second carrier, wherein the channel power information comprises first channel transmit power or comprises power information determined by the terminal device according to the first channel transmit power, and the first channel transmit power is channel transmit power of a first network device in a first uplink subframe of a first carrier, and wherein the second uplink subframe is located before a second downlink subframe of the second carrier, the second downlink subframe is a subframe for carrying scheduling grant information of a third uplink subframe of the second carrier, and the third uplink subframe completely overlaps or partially overlaps with the first uplink subframe; and a transmitter, configured to send second scheduling grant information to the terminal device in the second downlink subframe according to the channel power information, wherein the second scheduling grant information indicates second channel transmit power, and the second channel transmit power is the channel transmit power in the third uplink subframe of the second carrier.

17. The network device according to claim 16, wherein, when the power information is determined according to the first channel transmit power, the power information is power headroom information, and the power headroom information indicates remaining power of the terminal device after the first channel transmit power is subtracted from a maximum transmit power of the terminal device.

18. The network device according to claim 16, wherein the second uplink subframe is an uplink subframe determined by the terminal device according to a first timing relationship between the first uplink subframe and the second carrier.

19. The network device according to claim 16, wherein the second scheduling grant information comprises a quantity of resource blocks occupied by an uplink data channel of the terminal device in the first uplink subframe, a modulation and coding scheme, or a transmit power control (TPC) command.

20. The network device according to claim 16, wherein a length of the first uplink subframe is 1 ms, and wherein a length of the second uplink subframe is less than or equal to 0.5 ms and a length of the third uplink subframe is less than or equal to 0.5 ms.

* * * * *